(12) United States Patent
Shibata

(10) Patent No.: US 8,817,313 B2
(45) Date of Patent: Aug. 26, 2014

(54) IMAGE FORMING APPARATUS AND CONTROL METHOD OF IMAGE FORMING APPARATUS

(75) Inventor: Daisuke Shibata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 13/450,077

(22) Filed: Apr. 18, 2012

(65) Prior Publication Data

US 2012/0268791 A1   Oct. 25, 2012

(30) Foreign Application Priority Data

Apr. 21, 2011   (JP) .................... 2011-095349

(51) Int. Cl.
*G06F 15/00*   (2006.01)
(52) U.S. Cl.
USPC ............................................. 358/1.16
(58) Field of Classification Search
USPC ............................................. 358/1.16
See application file for complete search history.

(56) References Cited

U.S. PATENT DOCUMENTS

2008/0088867 A1*   4/2008   Ikeda et al. .................. 358/1.13

FOREIGN PATENT DOCUMENTS

| JP | 6-258907 A | 9/1994 |
| JP | 10-233920 A | 9/1998 |

* cited by examiner

*Primary Examiner* — Saeid Ebrahimi Dehkordy
(74) *Attorney, Agent, or Firm* — Canon USA Inc. IP Division

(57) ABSTRACT

A technique can prevent a parameter that is not to be read and set from history information and related to image formation from being read and reset from the history information. A method for controlling an image forming apparatus, includes setting a parameter for an adjustment item related to image formation, determining whether the adjustment item corresponding to the set parameter includes a storage inhibition item, performing control to store the set parameter as history information in a storing unit in a case where it is determined that the adjustment item does not include the storage inhibition item, and not to store the set parameter unit as the history information to the storing unit in a case where it is determined that the adjustment item includes the storage inhibition item, and setting the parameter stored in the storing unit to the adjustment item related to the image formation.

6 Claims, 12 Drawing Sheets

FIG. 2

IMAGE QUALITY ADJUSTMENT CATEGORY

COLOR MODE
DENSITY ADJUSTMENT
BACKGROUND IMAGE QUALITY ADJUSTMENT
COLOR BALANCE ADJUSTMENT
ADJUSTMENT BY ONE-TOUCH
SHARPNESS
CRITERIA OF CHARACTER AND PHOTO
COLOR CRITERIA
COLOR CRITERIA REGION
READING DENSITY
IMAGE REGION FLAG PROCESSING COEFFICIENT
HALFTONE PROCESSING COEFFICIENT
ERROR DIFFUSION PROCESSING COEFFICIENT
WHITE LEVEL INPUT TARGET VALUE
COLOR DEVIATION CORRECTION VALUE ~201

COMMON SETTING CATEGORY

MODE PRIORITY AT AUTOMATIC MONOCHROME SELECTION TIME
PRIORITY OF PRINT QUALITY/SPEED ~202

DEVICE SETTING CATEGORY

IMAGE WRITING POSITION ADJUSTMENT
TONER DENSITY TARGET VALUE ADJUSTMENT
PRINT MARGIN ADJUSTMENT
FIXING TEMPERATURE ADJUSTMENT
CURL REDUCTION MODE SETTING
BACKGROUND PATTERN PRINT LEVEL ADJUSTMENT
FRONT EDGE MARGIN ADJUSTMENT
REAR EDGE MARGIN ADJUSTMENT
MAGNIFICATION FINE ADJUSTMENT ~203

FIG. 5C

ADJUSTMENT MODE/PARAMETER

INPUT ADJUSTMENT ID FOR RESTORATION — 1011
1012          1013
0001          CHECK

FIXING TEMPERATURE ADJUSTMENT:-2
MAGNIFICATION FINE ADJUSTMENT:10
DENSITY ADJUSTMENT:1
COLOR BALANCE ADJUSTMENT:Y+2
— 1014

CANCEL — 1016      1015 — RESTORE

FIG. 5D

ADJUSTMENT MODE/ END MODE
ARE THE FOLLOWING ITEMS SET?

FIXING TEMPERATURE ADJUSTMENT:-2 — 1017
MAGNIFICATION FINE ADJUSTMENT:10
DENSITY ADJUSTMENT:1
COLOR BALANCE ADJUSTMENT:Y+2
— 1018

1021     1020     1019
CANCEL    NO      YES

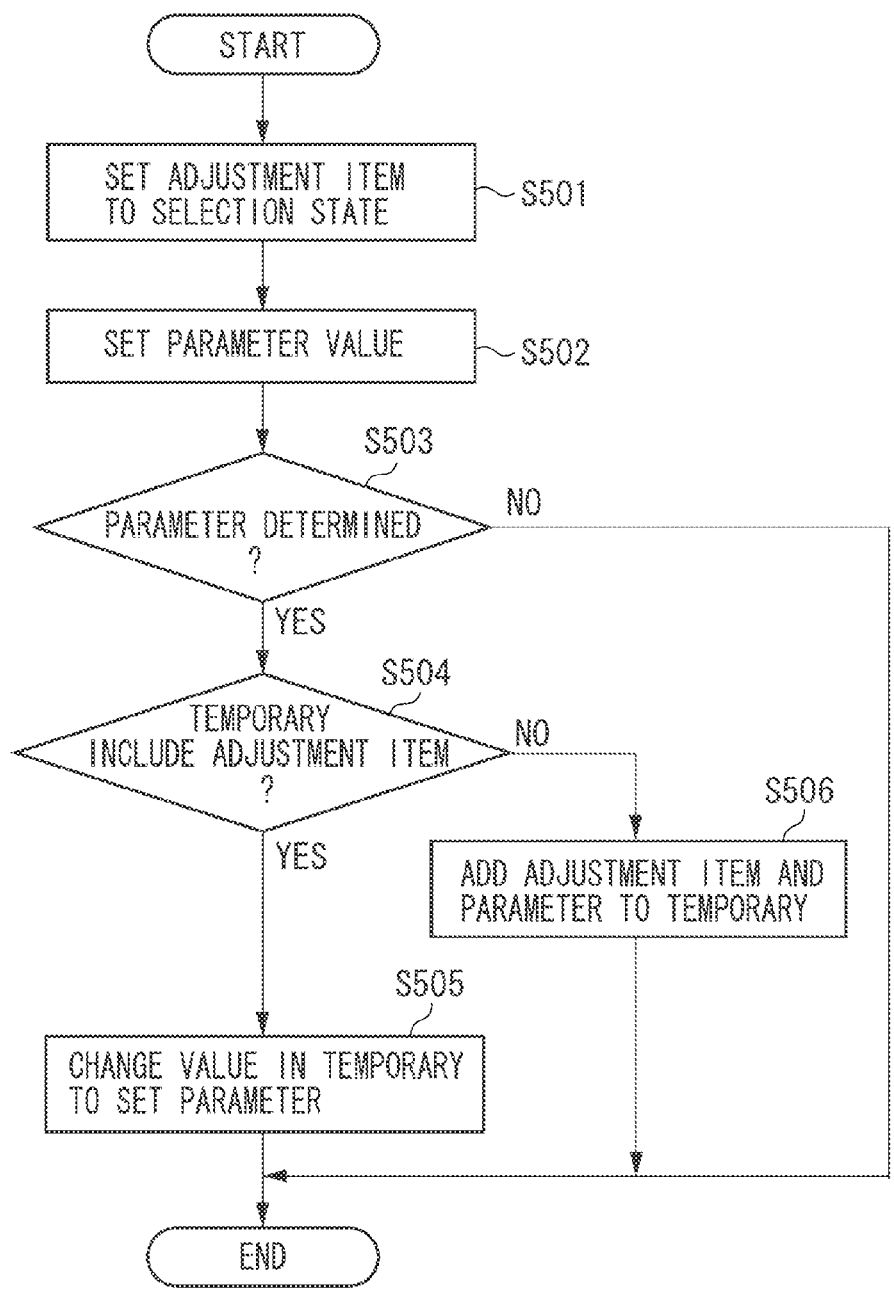

IMAGE FORMING APPARATUS AND CONTROL METHOD OF IMAGE FORMING APPARATUS

BACKGROUND OF THE INVENTION

1. Field of the Invention

The present invention relates to an image forming apparatus and a control method for the image forming apparatus.

2. Description of the Related Art

In a conventional image forming apparatus, various adjustments such as an image quality adjustment are performed to obtain desired tint or density of an output image. Depending on an adjustment item, it can be determined how an adjustment result is reflected only by outputting an image after changing a parameter.

When a user adjusts such items, the user repeatedly changes the respective parameters of the adjustment items, outputs images, and compares output results for the adjustment. When outputting the image, the user needs to take a note about the parameter set at the time of outputting, associate the output result with the note, and set the parameter with trial and error so as to recognize the appropriate parameter to be set to the adjustment item.

Japanese Patent Application Laid-Open No. 6-258907 discusses a technique to solve such issue. With the technique, a parameter value related to an image quality adjustment is combined to image information when an image is output. Thus, it can be known which parameter is set and output.

According to a technique discussed in Japanese Patent Application Laid-Open No. 10-233920, every time a parameter related to image quality adjustment is changed, a history of the set parameter is stored, and the parameter can be restored by calling the history, so that the parameter can be set efficiently.

For example, additional information such as a history number or a parameter is created and is then added to a designated portion within the output result, so that checking and comparison of the output results and resetting of the set parameter at the time can be efficiently performed.

With the configuration of the conventional image forming apparatus, a target parameter of the adjustment item is stored as history information and can be read and reset each time when the parameter related to the image quality adjustment is set. However, there are a large number of adjustment items that influence on an output product of the image forming apparatus, in addition to the items for the image quality adjustment. One of the adjustment items can critically influence on the image quality or the quality of a printed product depending on a value of the set parameter.

The adjustment item needs to be changed according to an install environment of the image forming apparatus. It is desirable that only an administrator with specialized knowledge can handle the adjustment. In addition, there may be a case that the administrator does not want to restore the parameter set during the adjustment, after ending the adjustment and determining parameters of the adjustment items. In such a case, there is also an issue that the parameter of the adjustment item is restored and reset based on the history information after ending the adjustment.

SUMMARY OF THE INVENTION

According to an aspect of the present invention, an image forming apparatus includes a setting unit configured to set a parameter for an adjustment item related to image formation, a determining unit configured to determine whether the adjustment item corresponding to the parameter set by the setting unit includes a storage inhibition item, a storing control unit configured to performs control to store the parameter set by the setting unit as history information in a storing unit in a case where the determining unit determines that the adjustment item does not include the storage inhibition item, and not to store the parameter set by the setting unit as the history information to the storing unit in a case where the determining unit determines that the adjustment item includes the storage inhibition item, and a control unit configured to read the parameter stored in the storing unit and to set the parameter to the adjustment item related to the image formation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A to 5D illustrate examples of user interface (UI) screens to be displayed on an operation unit of the image forming apparatus.

FIG. 6 is a flowchart illustrating a control method for the image forming apparatus.

DESCRIPTION OF THE EMBODIMENTS

Various exemplary embodiments, features, and aspects of the invention will be described in detail below with reference to the drawings.

<Description of System Configuration>

Figure 1:
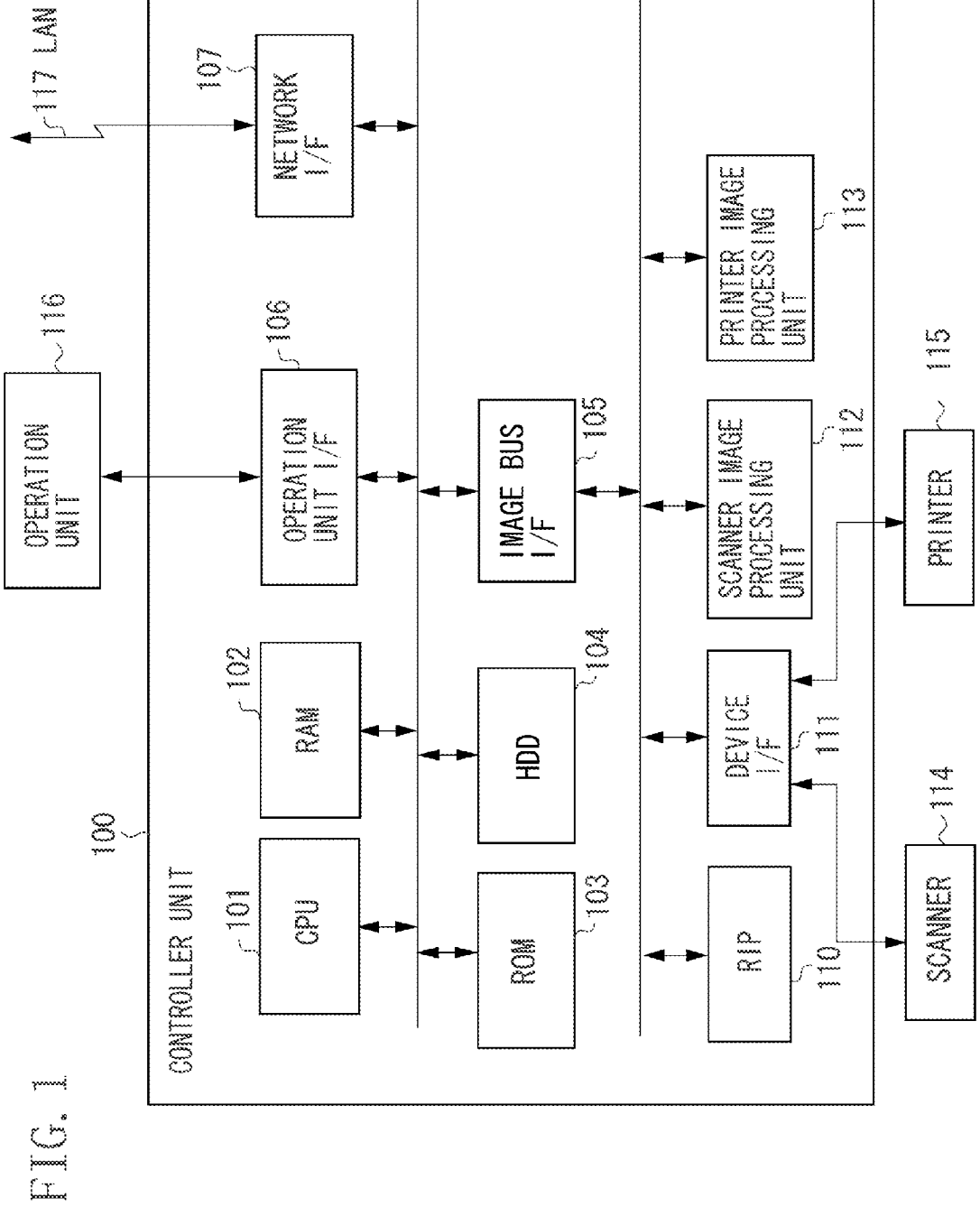
FIG. 1 is a block diagram illustrating a control configuration of an image forming apparatus.

FIG. 1 is a block diagram illustrating a control configuration of an image forming apparatus according to a first exemplary embodiment of the present invention. In an example in FIG. 1, the image forming apparatus is configured as a multifunction peripheral which can input and output an image, receive and transmit the image, and perform image processing. The image forming apparatus according to the present exemplary embodiment can switch an operation mode to a normal mode for performing image formation and an adjustment mode for adjusting an image forming condition in response to an instruction from an operation unit 116. According to the present exemplary embodiment, the multifunction peripheral is used as an example. Alternatively, the present invention may be applied to other devices, such as a printer device that executes a printer function, or the like.

Referring to FIG. 1, the image forming apparatus includes a controller unit 100 that entirely controls the apparatus, a scanner 114 as an image input device, a printer 115 as an image output device, and the operation unit 116 that receives an instruction from a user and provides information for the user. The scanner 114, the printer 115, and the operation unit 116 are connected to the controller unit 100, and are controlled by a command from the controller unit 100.

The controller unit 100 includes a central processing unit (CPU) 101 that controls a device connected to a system bus 108. The CPU 101 is connected to a random access memory (RAM) 102, a read only memory (ROM) 103, a hard disk drive (HDD) 104, an image bus interface (I/F) 105, an operation unit I/F 106, and a network I/F 107 via the system bus 108 to comprehensively control the image forming apparatus.

The RAM 102 is used as a work area of the CPU 101 and a setting value storage memory for temporarily storing a parameter setting value. Further, the RAM 102 is also used as an image memory for temporarily storing image data. The ROM 103 is a boot ROM and stores a system boot program.

The HDD 104 stores system software, a parameter setting value history, image data, and so on. The HDD 104 can store a parameter of an item used in the normal mode set by a user with the operation unit 116, a parameter of an item set in the adjustment mode, and history information by which the parameter is associated with the item set by a setting unit. The details are described below with reference to FIGS. 3A and 3B.

The operation unit I/F 106 inputs/outputs data to/from the operation unit 116. The operation unit I/F 106 outputs image data to be displayed on the operation unit 116 thereto, and transmits information input via the operation unit 116 by the user to the CPU 101. The operation unit 116 displays a user interface (UI) screen, which is described below. The user sets a parameter of the item for image formation by switching the normal mode for forming an image and the adjustment mode for adjusting an image on the UI screen. The parameter of the item set via the UI screen is stored in the HDD 104 and managed as the history information.

The network I/F 107 is connected to a local area network (LAN) 117 to input/output the information thereto/therefrom. The image bus I/F 105 connects the system bus 108 to an image bus 109, as a bus bridge for converting a data structure. A raster image processor (RIP) 110 rasterizes a page description language (PDL) code received from the LAN 117 to a bit map image.

A device I/F 111 connects the scanner 114 and the printer 115 to the controller unit 100 to perform conversion between synchronous and asynchronous systems of the image data. Further, data of an adjustment value is transmitted via the device I/F 111 to the scanner 114 and the printer 115. The RIP 110, the device I/F 111, a scanner image processing unit 112, and a printer image processing unit 113 are connected to the image bus 109. The printer 115 outputs image information created from contents of the parameter of the item set by the CPU 101 in the adjustment mode and identification information to a recording sheet.

Figure 2:
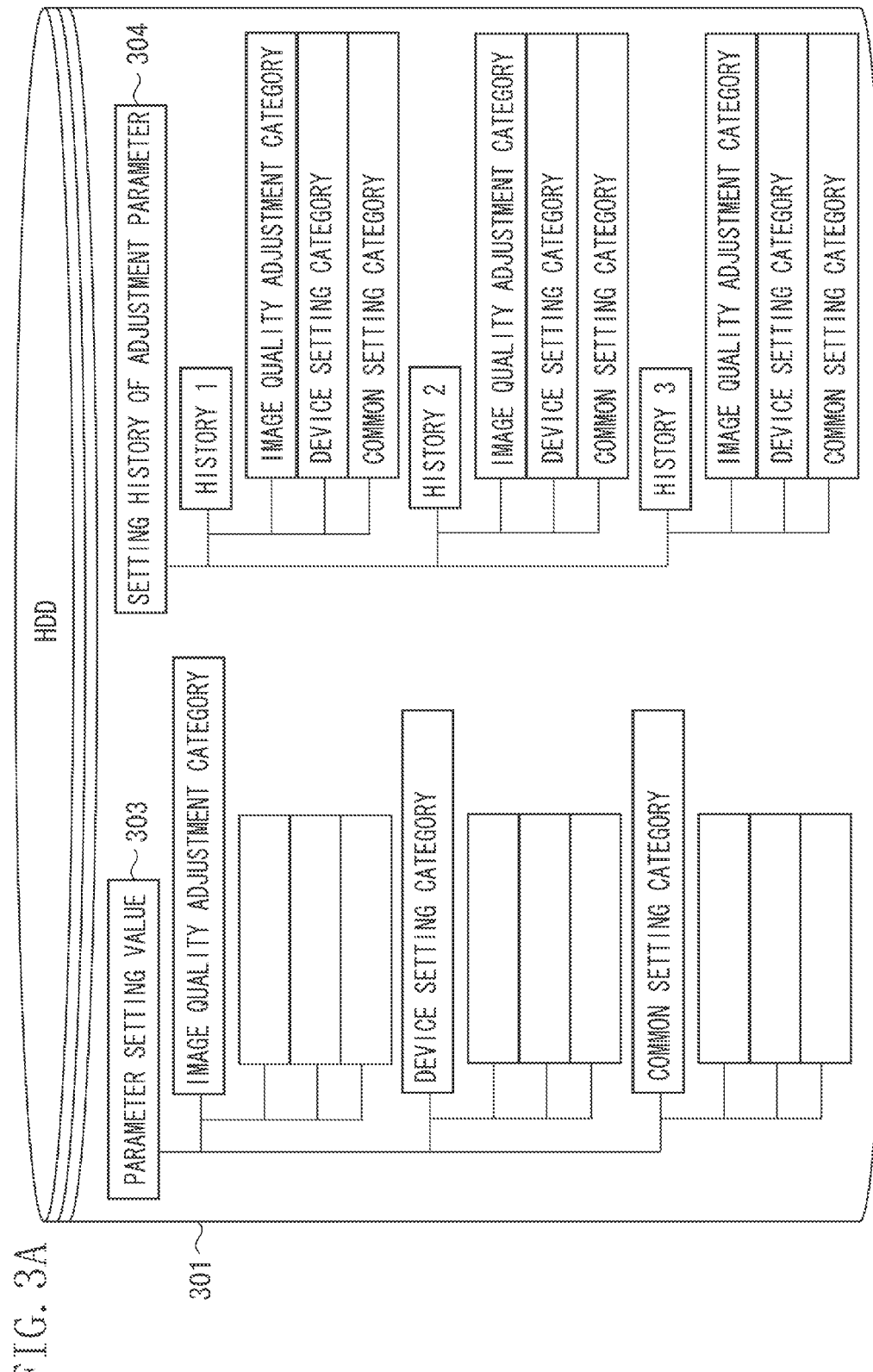
FIG. 2 illustrates an example of adjustment items in the image forming apparatus in FIG. 1.

FIG. 2 illustrates examples of the adjustment items that can be adjusted by the image forming apparatus in FIG. 1. In the example in FIG. 2, there are items for image formation.

Referring to FIG. 2, an image quality adjustment category 201 includes settings of the scanner image processing unit 112 and the printer image processing unit 113. As illustrated in FIG. 2, the image adjustment category 201 contains adjustments of density, background image quality, color balance, and reading density. The image adjustment category 201 further contains adjustments of an image region flag processing coefficient, a halftone processing coefficient, and a color deviation correction value. A common setting category 202 includes common settings of the entire image forming apparatus. More specifically, the common setting category 202 includes a mode priority setting at automatic monochrome selection time and a priority setting of print image quality or image formation speed.

A device setting category 203 includes operational settings of the scanner 114 and the printer 115. The item included in the device setting category 203 needs an adjustment, and includes a setting that can critically influence on a formed image depending on the parameters set to the item. The device setting category 203 further includes adjustments of an image writing position, a target value of toner density, a print margin, a fixing temperature, and a print level of a background pattern.

If a user without a special knowledge can easily use the items in the device setting category 203, the image quality or quality of a print product may be greatly affected. For example, in the case of adjusting the writing position, if the adjustment value is exceedingly large, a toner is transferred to a portion where there is not a sheet. In the case of adjusting the target value of the toner density, if the adjustment value is increased, the density rises. However, if the adjustment value is exceedingly increased, the toner may be easily scattered. Further, in the adjustment of the fixing temperature, if the adjustment value is extremely reduced, the toner fixing performance deteriorates. On the other hand, if the adjustment value is exceedingly increased, a part of the toner is removed by a thermal roller in a fixing device, and the image quality deteriorates.

It is desirable that these adjustment items are set carefully by only the user with the special knowledge who is authorized by inputting an administrator code via the operation unit 116. Further, it is not preferable that these adjustment items are easily called and used using a setting history. Therefore, according to the present exemplary embodiment, even if the parameters of the adjustment items are input, the parameter is not stored as the history information.

As well as the adjustment items in this example, the adjustment items used to operate the image forming apparatus include a network setting, a specification setting of transmission/reception, a specification setting of a report, and a system administrator setting. These adjustment items are not adjusted based on an output image, thus descriptions thereof are omitted in the present exemplary embodiment.

Figure 3:
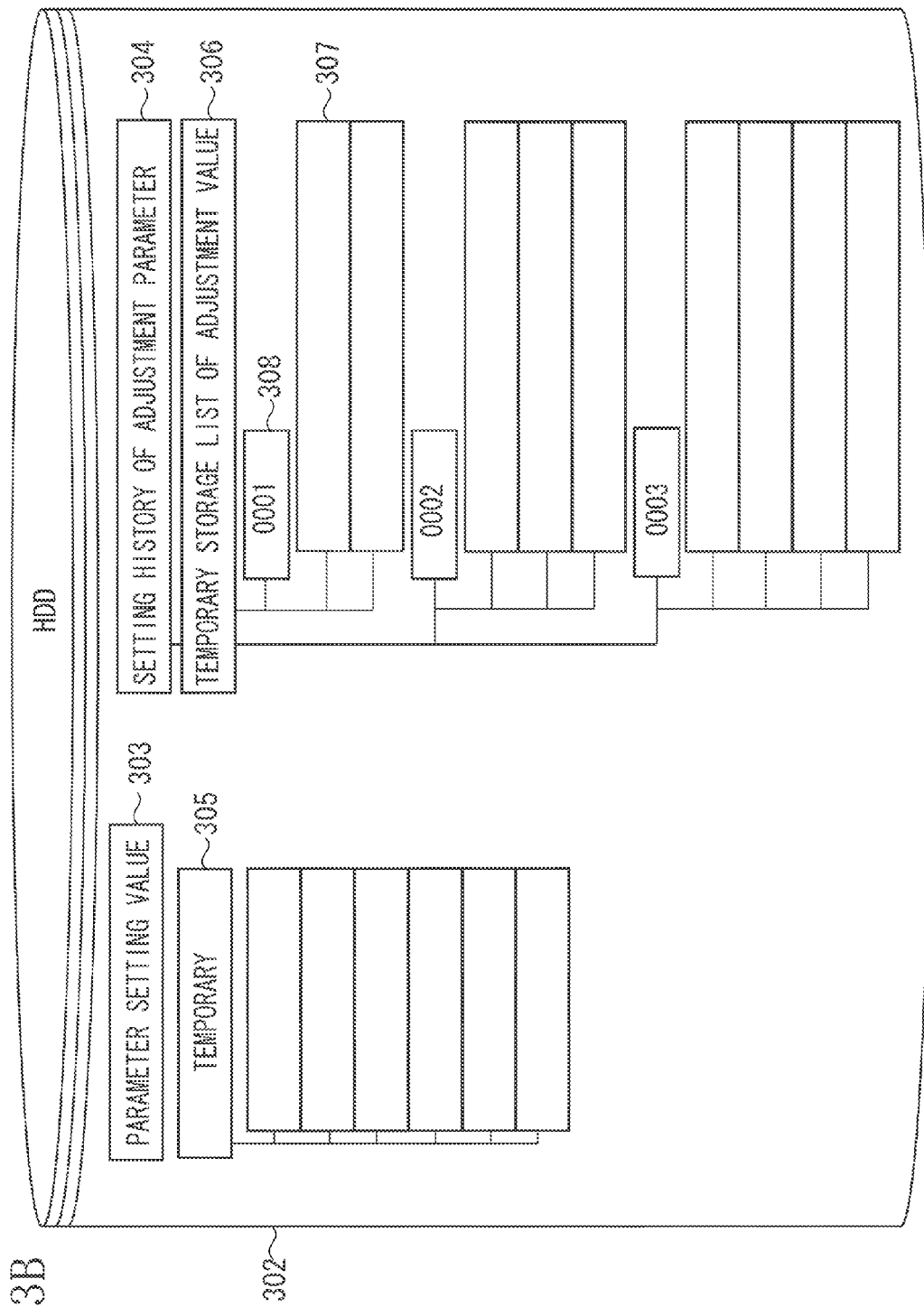
FIGS. 3A and 3B illustrate storage states of information pieces stored in a hard disk drive (HDD) in FIG. 1.

FIGS. 3A and 3B illustrate storage states of information pieces that are stored and managed in the HDD 104 in FIG. 1. The information pieces related to the adjustment are stored in a hierarchical structure according to two modes, that is a normal mode 301 in FIG. 3A and an adjustment mode 302 in FIG. 3B.

In the two modes, the adjustment items and the parameters thereof are stored as the information on the adjustment. The adjustment items and the parameters are stored in the HDD 104 in the controller unit 100, and are referred to and changed as needed, when the apparatus operates. In the mode change, the normal mode 301 and the adjustment mode 302 can be switched when a mode change request is received from the operation unit 116 operated by the user.

FIG. 3A illustrates a storage state of the information pieces stored in the HDD 104 in the normal mode 301. In the normal mode 301, a parameter setting value 303 stores the parameter whose change is instructed from the operation unit 116 and is referred to when the image forming apparatus operates. A parameter setting history list 304 stores contents of the parameter setting value 303 as the history information when the image forming apparatus operates.

The parameter setting value 303 stores the adjustment items in FIG. 2 and the respective parameters thereof. The parameter setting history list 304 stores the parameter setting values 303 as the history information which are stored when the image forming apparatus operates. If the number of storable history information pieces is limited, the history information is sequentially deleted from the older one, and new history information is stored in a free area. The parameter can be reflected to the parameter setting value 303 from the history information in the parameter setting history list 304.

FIG. 3B illustrates the storage state of the information pieces stored in the HDD 104 in the adjustment mode 302. In the adjustment mode 302, a temporary 305 and an adjustment value temporary storage list 306 are created and stored in addition to the parameter setting value 303 and the parameter setting history list 304 used in the normal mode 301.

In the adjustment mode 302, the parameter setting value 303 and the parameter setting history list 304 can be referred to. However, the parameter setting value 303 and the parameter setting history list 304 cannot be changed. The temporary 305 stores the adjustment item and the parameter thereof which are changed in the adjustment mode 302. The adjustment value temporary storage list 306 stores a temporary storage information list 307 and a list identification (ID) 308 which are associated with each other.

A plurality of the list IDs 308 can be stored. A plurality of the parameters corresponding to a plurality of the adjustment items can be stored for the respective list IDs 308. When the image forming apparatus operates in the adjustment mode 302, contents stored in the temporary 305 are stored to the temporary storage information list 307, and the list ID 308 is created. A detailed operation at that time is described below.

Figure 4:
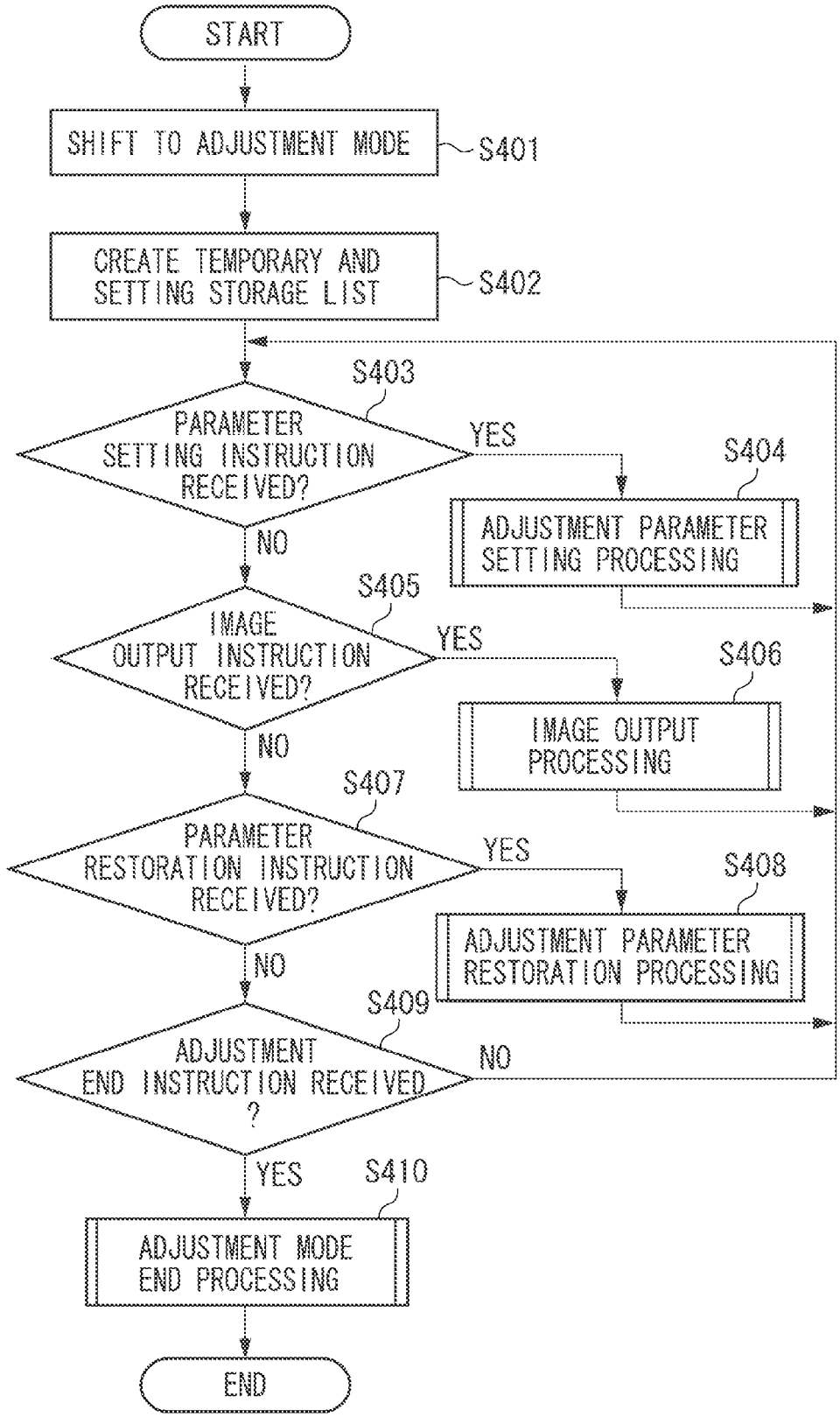
FIG. 4 is a flowchart illustrating a control method for the image forming apparatus.

An operation of the image forming apparatus according to the first exemplary embodiment of the present invention is described with reference to a flowchart in FIG. 4. FIG. 4 illustrates a control method for the image forming apparatus according to the present exemplary embodiment.

In the example in FIG. 4, the user can instruct the CPU 101 via the operation unit 116 to change the mode, set an adjustment parameter, output an image, and restore the adjustment parameter setting history. The CPU 101 of the controller unit 100 receives the instruction input via the operation unit 116. Processing in each step in the flowchart is realized by the CPU 101 loading a control program stored in the ROM 103 or the HDD 104 to the RAM 102 and executing the loaded control program.

Figure 5A:
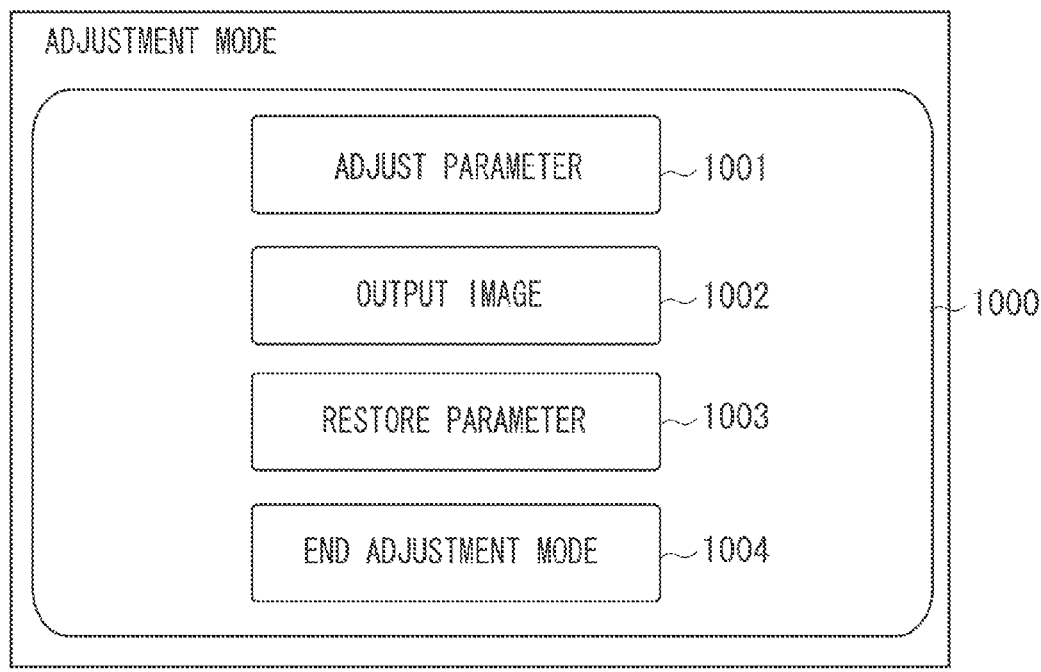

In step S401, the CPU 101 receives a mode change instruction from the operation unit 116 operated by the user, and shifts a state of the image forming apparatus from the normal mode 301 to the adjustment mode 302. In step S402, the CPU 101 creates the temporary 305 and the adjustment value temporary storage list 306 in FIG. 3B on the HDD 104. FIG. 5A illustrates an example of a user interface (UI) screen 1000 displayed on the operation unit 116 by the CPU 101 when the mode is changed to the adjustment mode 302. The UI screen 1000 includes an adjustment parameter setting instruction button 1001, an image output instruction button 1002, an adjustment parameter restoration instruction button 1003, and an adjustment end instruction button 1004.

In step S403, the CPU 101 determines whether the user presses the adjustment parameter setting instruction button 1001 on the UI screen 1000 and a parameter setting instruction is received. If the CPU 101 determines that the user presses the adjustment parameter setting instruction button 1001 and the parameter setting instruction is received (YES in step S403), the processing advances to step S404. In step S404, the CPU 101 performs the adjustment parameter setting processing. The details of processing in step S404 are described below with reference to FIG. 6.

If the CPU 101 determines that the user does not press the adjustment parameter setting instruction button 1001 and the parameter setting is not instructed from the user (NO in step S403), the processing advances to step S405.

In step S405, the CPU 101 determines whether the user presses the image output instruction button 1002 on the UI screen 1000 and an image output instruction is received. If the CPU 101 determines that the user presses the image output instruction button 1002 and receives the image output instruction (YES in step S405), the processing advances to step S406.

In step S406, the CPU 101 executes image output processing, which will be described below with reference to FIG. 7, and returns the processing to step S403. If the CPU 101 determines that the user does not press the image output instruction button 1002 and the image output instruction is not received (NO in step S405), the processing advances to step S407.

Figure 9:
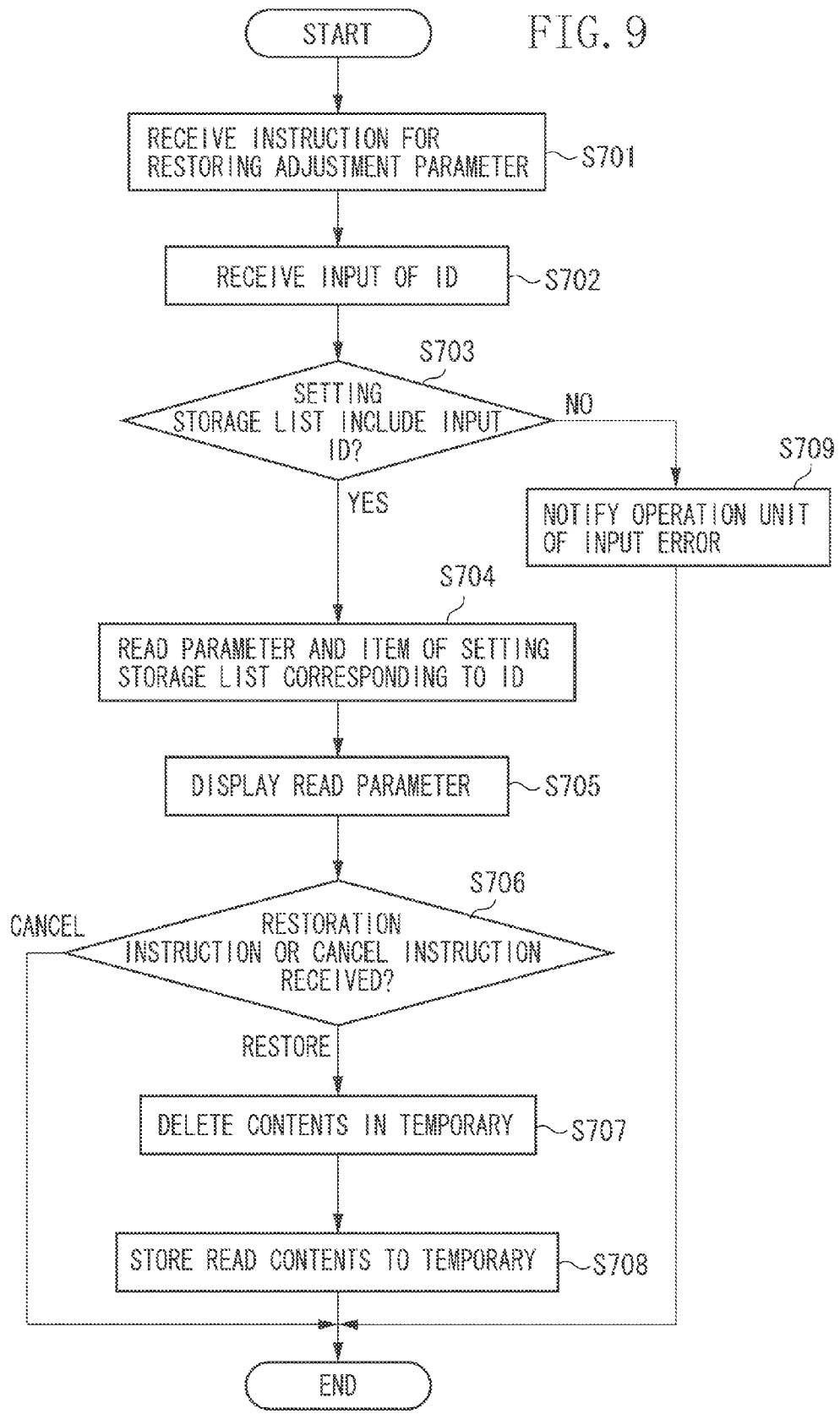
FIG. 9 is a flowchart illustrating a control method for the image forming apparatus.

In step S407, the CPU 101 determines whether the user presses the adjustment parameter restoration instruction button 1003 on the UI screen 1000 and a parameter restoration instruction is received. If the CPU 101 determines that the user presses the adjustment parameter restoration instruction button 1003 and the parameter restoration instruction is received (YES in step S407), the processing advances to step S408. In step S408, the adjustment parameter restoration processing, which is described below with reference to FIG. 9, is executed and the processing returns to step S403.

Whereas if the CPU 101 determines that the user does not press the adjustment parameter restoration instruction button 1003 and the parameter restoration instruction is not received (NO in step S407), the processing advances to step S409. In step S409, the CPU 101 determines whether the user presses an adjustment end instruction button 1004 on the UI screen 1000 and an adjustment end instruction is received. If the CPU 101 determines that the user presses the adjustment end instruction button 1004 and the adjustment end instruction is received (YES in step S409), then in step S410, the CPU 101 executes the adjustment mode end processing, which is described below with reference to FIG. 10, and the processing ends.

If the CPU 101 determines that the user does not press the adjustment end instruction button 1004 and the parameter restoration instruction is not received (NO in step S409), the processing returns to step S403.

The adjustment parameter setting processing in step S404 in FIG. 4 is described below with reference to FIG. 6.

FIG. 6 is a flowchart illustrating control processing executed in the image forming apparatus according to the present exemplary embodiment. The processing in FIG. 6 corresponds to a detailed sequence of the adjustment parameter setting processing in step S404 in FIG. 4. Processing in each step in the flowchart is realized by the CPU 101 loading a control program stored in the ROM 103 or the HDD 104 to the RAM 102 and executing the loaded control program.

Figure 5B:
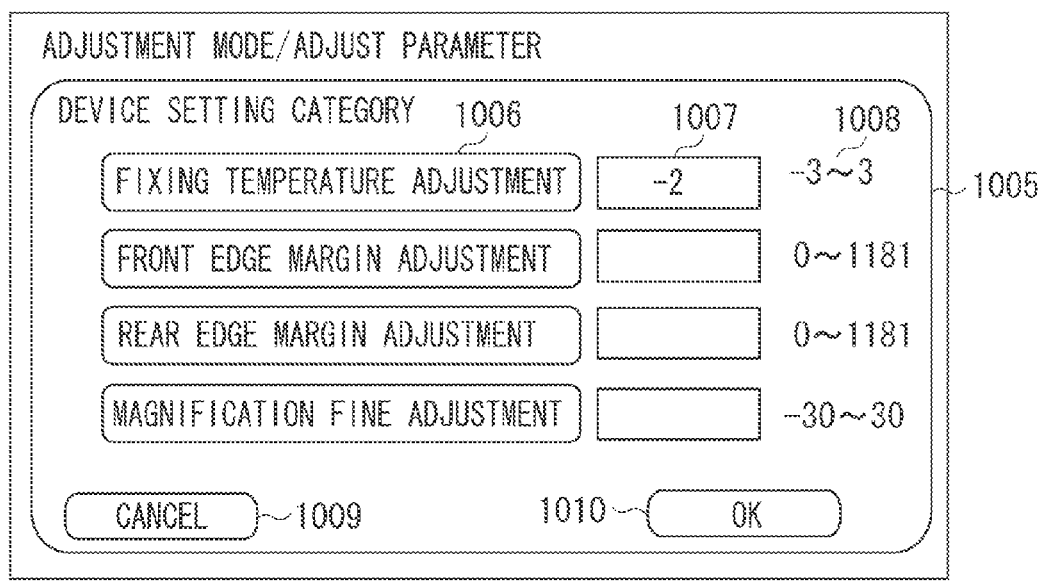

FIG. 5B illustrates an example of a user interface (UI) screen 1005 displayed on a display portion in the operation unit 116 illustrated in FIG. 1, that is, an adjustment mode/parameter adjustment screen 1005 indicated to the user when setting the adjustment parameter. In the example, the UI screen 1005 is configured to enable a user to set the parameter from a range set to each item.

In step S501, when the user presses a specific adjustment item button 1006, the CPU 101 performs control to switch a display mode of the adjustment item button 1006 to a selected state (a reversal display state). As long as the user can identify the selected state by changing a display state from other buttons, the display mode is not limited to the above example.

In step S502, the CPU 101 receives and sets a parameter 1007 that is input to the selected adjustment item from the user by operating a numeric keypad. A range of the received parameter is indicated with a setting range guide 1008, and the CPU 101 performs control not to receive an input of a value out of the range.

The screen in FIG. 5B corresponds to a state in which the user selects the setting of fixing temperature and inputs "−2" to the parameter.

In step S503, the CPU 101 determines whether an OK button 1010 is pressed, functioning as an instruction button for determining the parameter set by the user in step S502. If the CPU 101 determines that the OK button 1010 is pressed (YES in step S503), the processing advances to step S504.

If the CPU 101 determines whether a cancel button 1009 is pressed to instruct the cancel of the setting parameter (NO in step S503), the adjustment parameter setting processing ends.

In step S504, the CPU 101 determines whether the information stored in the temporary 305 in FIG. 2 includes the adjustment item set in step S502. If the CPU 101 determines that the information stored in the temporary 305 includes the adjustment item (YES in step S504), in step S505, a parameter portion of the adjustment item in the temporary 305 is changed to the parameter 1007 received in step S502, and the processing then ends.

If the CPU 101 determines that the information stored in the temporary 305 does not include the adjustment item set in step S502 (NO in step S504), the processing advances to step S506. In step S506, the CPU 101 adds the adjustment item button 1006 and the parameter 1007 to the information stored in the temporary 305, and then the present processing ends.

Figure 7:
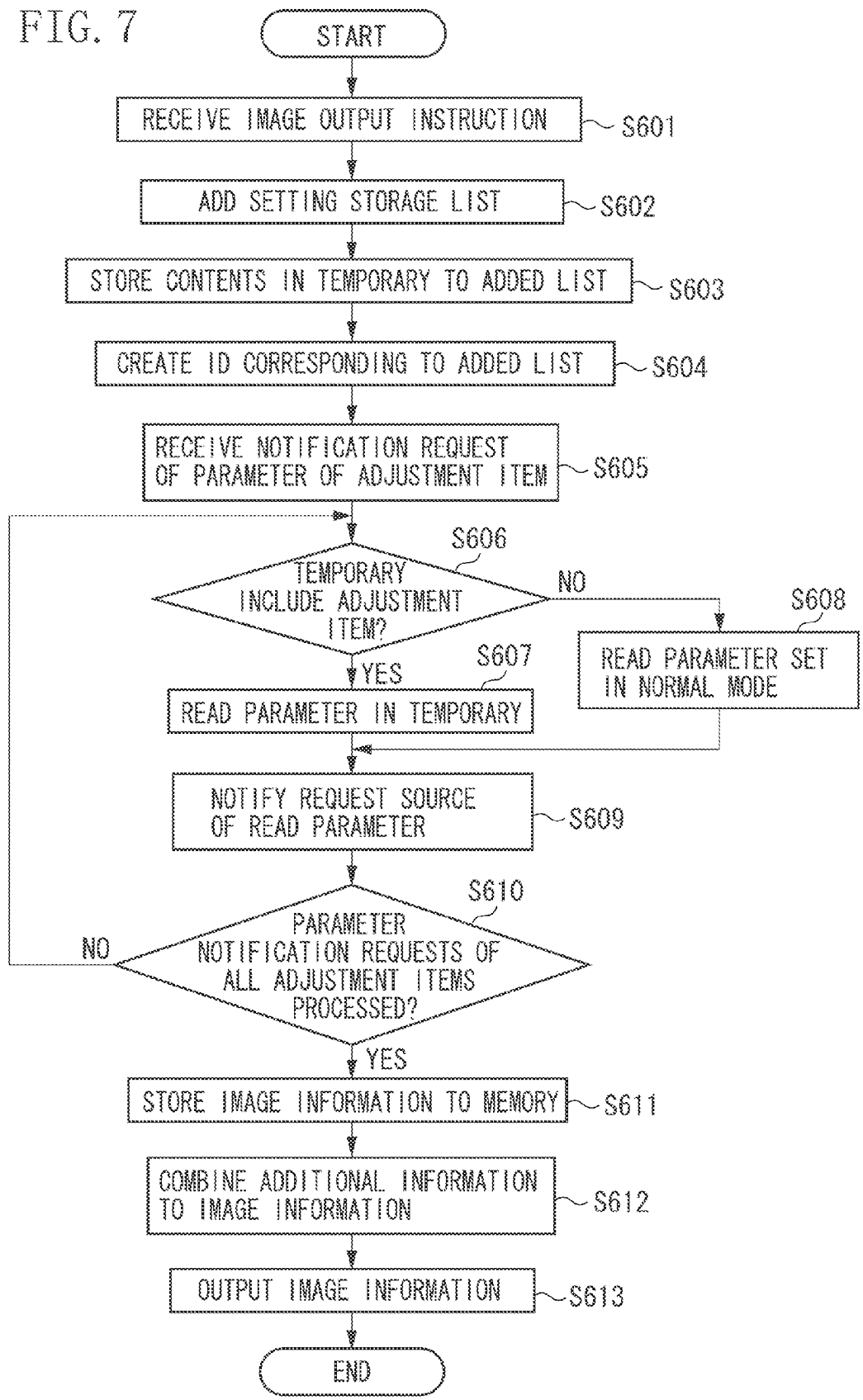
FIG. 7 is a flowchart illustrating a control method for the image forming apparatus.

FIG. 7 is a flowchart illustrating control processing executed in the image forming apparatus according to the present exemplary embodiment The processing in FIG. 7 is a detailed sequence of the image output processing in step S406 in FIG. 4. Processing in each step in the flowchart is realized by the CPU 101 loading a control program stored in the ROM 103 or the HDD 104 to the RAM 102 and executing the loaded control program. The image output processing is executed when the image output instruction is received.

The image output is instructed by operating the operation unit 116 by the user or via the network 117 when the apparatus is connected thereto. The processing when the user operates the operation unit 116 is described as an example.

In step S601, the CPU 101 receives the image output instruction button 1002 pressed by the user. In step S602, the CPU 101 adds a new temporary storage information list 307 to the adjustment value temporary storage list 306 illustrated in FIG. 3B.

In step S603, the CPU 101 reads contents stored in the temporary 305, and stores the read contents to the temporary storage information list 307 added in step S602. In step S604, the CPU 101 creates the list ID 308 corresponding to the temporary storage information list 307 added in step S602.

In step S605, the CPU 101 receives a parameter notification request of the adjustment item required to output an image from the scanner 114 or the printer 115 via the corresponding scanner image processing unit 112, printer image processing unit 113, or device I/F 111.

In step S606, the CPU 101 determines whether the temporary 305 includes the adjustment item. If the CPU 101 determines that the temporary 305 includes the adjustment item (YES in step S606), then in step S607, the CPU 101 reads the parameter of the adjustment value in the temporary 305, and the processing advances to step S609.

If the CPU 101 determines that the temporary 305 does not include the adjustment item (NO in step S606), then in step S608, the CPU 101 reads the parameter of the adjustment item from the parameter setting value 303 set in the normal mode 301.

In step S609, the CPU 101 notifies the request source corresponding to the adjustment item of the value read in step S607 or S608.

In step S610, the CPU 101 determines whether parameter notification requests are processed for all adjustment items. If the CPU 101 determines that the parameter notification requests are not processed for all adjustment items (NO in step S610), the processing returns to step S606, and the similar processing is repeated.

Figure 8:
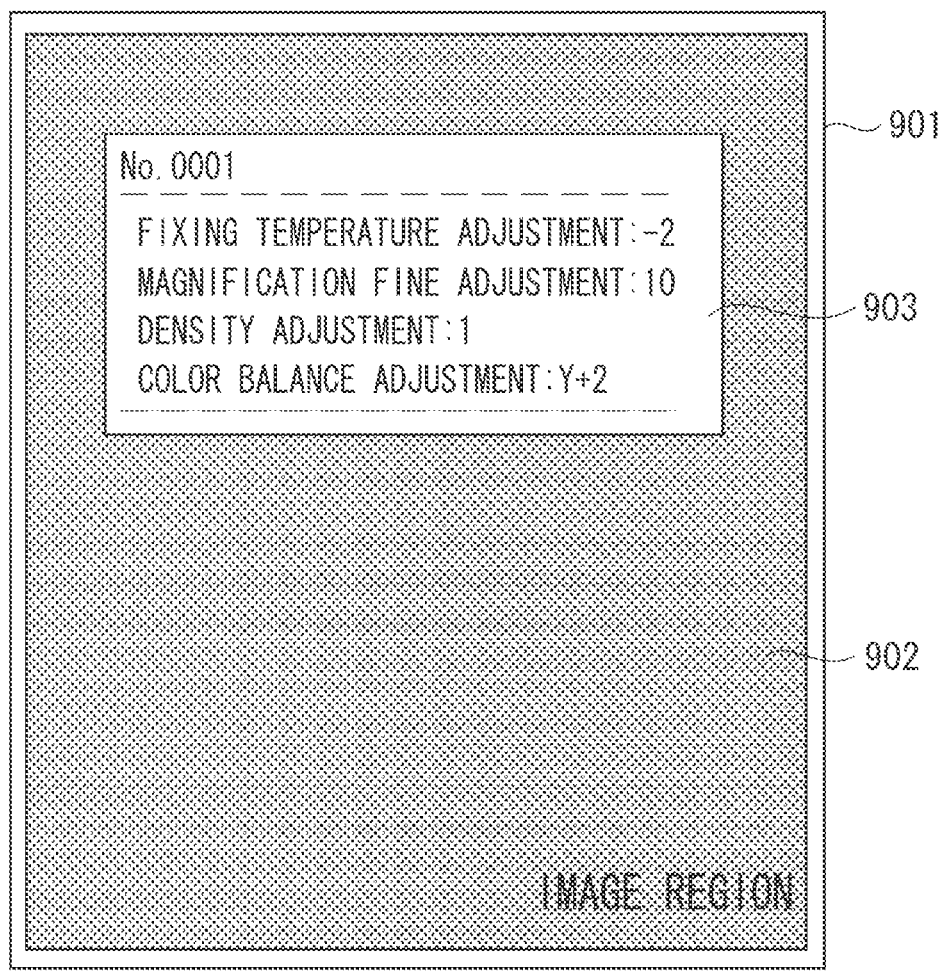
FIG. 8 illustrates setting parameters used for outputting an image from the image forming apparatus.

If the CPU 101 determines that the parameter notification requests are processed for all adjustment items (YES in step S610), the processing advances to step S611. In step S611, the CPU 101 notifies the scanner 114 of scan operation start. The CPU 101 receives the image information read according to the parameter notified in response to the notification request via the device I/F 111. The received image information is processed by the scanner image processing unit 112 and is stored to the RAM 102. Image information 901 illustrated in FIG. 8 is an example of the stored image information.

In step S612, the CPU 101 combines additional information created from the list ID 308 in step S604 and the temporary 305 to the image information stored in the RAM 102. The created additional information may be the list ID 308, or the adjustment value corresponding to the list ID 308 and the parameter thereof. Additional information 903 illustrated in FIG. 8 is an example created from the list ID 308 and the contents in the temporary 305. FIG. 8 illustrates an example when the image information created from contents of the parameter of the item set in the adjustment mode and identification information (i.e., No. 0001) is output as an image on the recording sheet.

In step S613, the CPU 101 causes the printer image processing unit 113 to perform image processing on the image information in the RAM 102 and transmits the processed image information to the printer 115 via the device I/F 111. Then, the processing ends. Accordingly, the printer 115 outputs the image information transmitted from the controller unit 100 according to the parameter notified from the CPU 101. An output product 901 in FIG. 8 is an example of the output product from the printer 115.

The user can determine an adjustment result using the parameter set by the image forming apparatus based on the output product 901. The adjustment result is determined based on an image printed on the output product 901, the position of an image region 902 on the output product 901, and a status of the output product 901 itself.

FIG. 9 is a flowchart illustrating control processing executed in the image forming apparatus according to the present exemplary embodiment. The processing in FIG. 9 is a detailed sequence of the adjustment parameter restoration processing in step S408 in FIG. 4. Processing in each step in the flowchart is realized by the CPU 101 loading a control program stored in the ROM 103 or the HDD 104 to the RAM 102 and executing the loaded control program. The adjustment parameter restoration processing corresponds to reading processing of the adjustment parameter from the temporary storage information list 307.

In step S701, the CPU 101 receives that the user presses the adjustment parameter restoration instruction button 1003. FIG. 5C illustrates an example of a user interface (UI) screen 1011 indicated to the user during the adjustment parameter restoration. FIG. 5C illustrates the UI screen 1011 which displays the parameter of the item stored in the HDD 104 in the adjustment mode according to the identification information input from the operation unit 116 by the user.

In step S702, the CPU 101 receives an identifier (ID) input from the operation unit 116 operated by the user. Although the ID input from the operation unit 116 by the user is received, the output product 901 output in step S614 may be read by the scanner 114 and the list ID 308 may be extracted and received from the additional information 903 in the read image information. The processing when the user operates the operation unit 116 to directly input the ID, and the controller unit 100 receives the ID via the operation unit I/F 106 is described as a specific example. At that time, the operation unit 116 displays a filed for adjustment mode/parameter restoration 1011, and the CPU 101 receives the press operation of a check instruction button 1013 after input of an ID 1012.

In step S703, the CPU 101 searches an ID matching the received ID 1012 from the list ID 308 in the adjustment value temporary storage list 306 to determine whether the list ID 308 includes the matching ID.

If the CPU 101 determines that the list ID 308 includes the matching ID (YES in step S703), the processing advances to step S704. In step S704, the CPU 101 reads the adjustment item and the parameter thereof stored in the temporary storage information list 307 corresponding to the matching ID. In step S705, the CPU 101 displays the information to a temporary information display column 1014.

In step S706, the CPU 101 receives an instruction by the user pressing a restoration instruction button 1015 or a cancel instruction button 1016. If the CPU 101 determines that the instruction is received via pressing of the restoration instruction button 1015 (RESTORE in step S706), the processing advances to step S707.

Whereas if the CPU 101 determines that the instruction is received via pressing of the cancel instruction button 1016 (CANCEL in step S706), the adjustment parameter restoration processing ends.

In step S707, the CPU 101 deletes the contents of the temporary 305 created on the HDD 104 in FIG. 3B.

In step S708, the CPU 101 stores information of the matching ID read from the temporary storage information list 307 to the temporary 305, and the processing ends.

In step S703, if the CPU 101 determines that the list ID 308 does not include the matching ID (NO in step S703), the processing advances to step S709. In step S709, the CPU 101 notifies the operation unit 116 of the absence of the received ID 1012 in the adjustment value temporary storage list 306 via the operation unit I/F 106, and the processing ends.

An example of the adjustment parameter restoration processing is described below. The user inputs the ID "0001" from the operation unit 116 based on the additional information 903 described to the output product 901 in FIG. 8. Then, the CPU 101 receives the ID "0001". The CPU 101 searches an ID matching the ID "0001" from the list ID 308 in the adjustment value temporary storage list 306, and displays the matching ID to the temporary information display column 1014 from the temporary storage information list 307 corresponding to the ID "0001". The display contents match the additional information 903 of the output product 901. When pressing of the restoration instruction button 1015 is received, the adjustment item and the parameter in the temporary information display column 1014 are then stored to the temporary 305.

Figure 10:
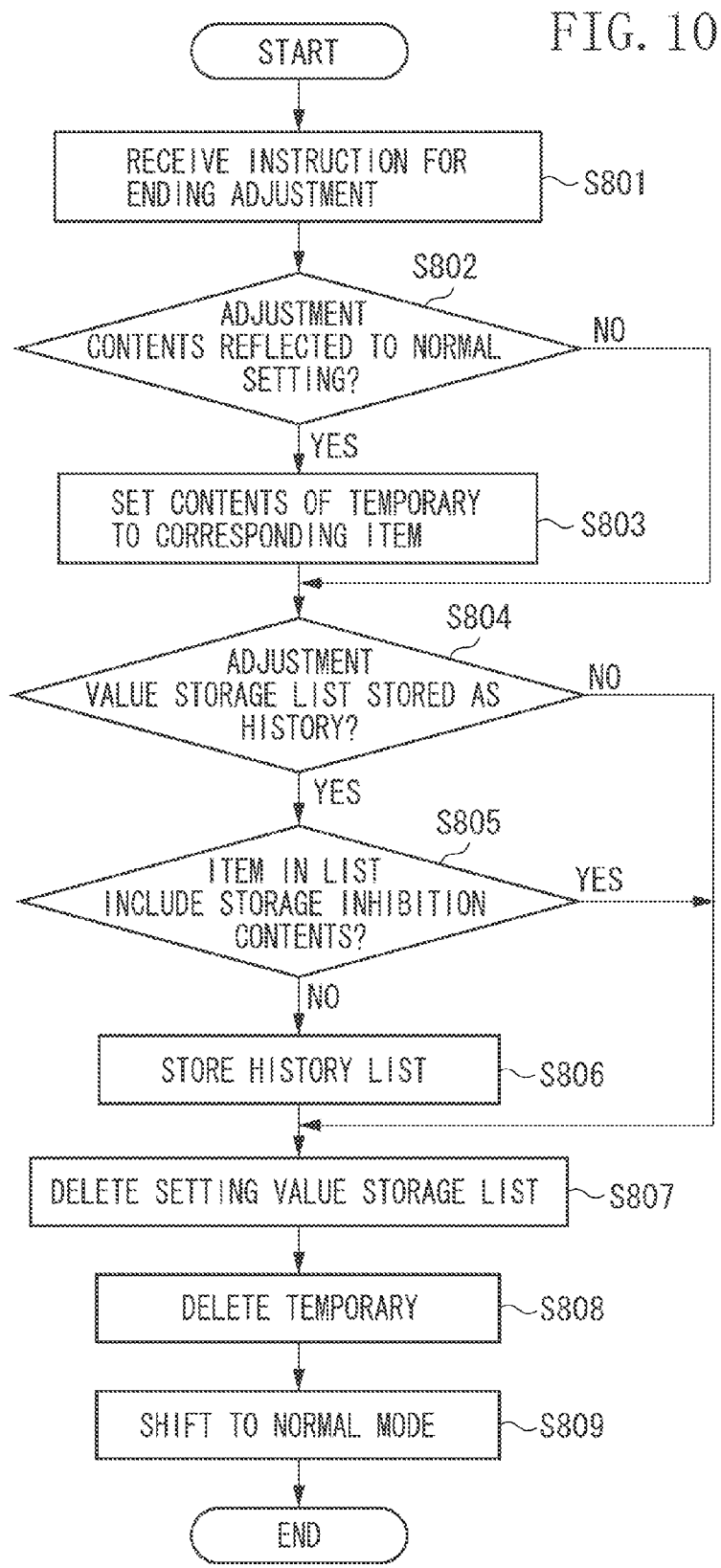
FIG. 10 is a flowchart illustrating a control method for the image forming apparatus.

FIG. 10 is a flowchart illustrating control processing executed in the image forming apparatus according to the present exemplary embodiment The processing e in FIG. 10 corresponds to a detailed sequence of the adjustment mode end processing in step S410 in FIG. 4. Processing in each step in the flowchart is realized by the CPU 101 loading a control program stored in the ROM 103 or the HDD 104 to the RAM 102 and executing the loaded control program. A description is given of processing for determining by the CPU 101 whether a storage inhibition item is included in the item of the parameter which is stored in a storing unit in the adjustment mode after updating of the parameter. Further, a description is given of control processing for storing the history information including the item set according to the determination result and the parameter thereof to the HDD 104 by the CPU 101.

In step S801, the CPU 101 receives an instruction by the user pressing the adjustment end instruction button 1004. FIG. 5D illustrates an example of a UI screen 1017 displayed on the operation unit 116 indicated to the user in the mode end processing.

In step S802, the CPU 101 displays a button for instructing whether contents in the temporary 305 in FIG. 3B are stored as the parameter setting value 303 in the normal mode 301 on the operation unit 116. More specifically, the CPU 101 displays a YES button 1019, a NO button 1020, and a cancel button 1021 on the operation unit 116. The CPU 101 displays contents of the temporary 305 on a current setting display column 1018 in FIG. 3B. The NO button 1020 indicates that the contents of the adjustment are not reflected to the current setting. If the CPU 101 determines that the instruction is received from the user via pressing of the NO button 1020 (NO in step S802), the processing advances to step S804.

The YES button 1019 indicates that the contents of the adjustment are reflected to the current setting. If the CPU 101 determines that the instruction is received via pressing of the YES button 1019 (YES in step S802), the processing advances to step S803. In step S803, the CPU 101 stores the parameter of the adjustment item stored in the temporary 305 as the parameter of the corresponding adjustment item in the parameter setting value 303 in the normal mode 301.

In step S804, the CPU 101 determines whether a selection instruction indicating whether the adjustment value temporary storage list 306 is stored as the parameter setting history list 304 in the normal mode 301 is received from the user. If the CPU 101 determines that the selection instruction not to store the adjustment value temporary storage list 306 is received from the user (NO in step S804), the processing advances to step S807.

If the CPU 101 determines that the selection instruction to store the adjustment value temporary storage list 306 is received from the user (YES in step S804), the processing advances to step S805. In step S805, the CPU 101 determines whether the adjustment item in the temporary storage information list 307 of the adjustment value temporary storage list 306 includes the storage inhibition item. According to the present exemplary embodiment, the adjustment item included in the device setting category 203 in FIG. 2 corresponds to the storage inhibition item.

If the CPU 101 determines that the storage inhibition item is not included (NO in step S805), the processing advances to step S806. In step S806, the CPU 101 adds the temporary storage information list 307 to the parameter setting history list 304 in the normal mode 301. Accordingly, contents of the parameter in the normal mode are updated with the parameter of the item displayed on the operation unit 106.

If the CPU 101 determines that the adjustment item in the temporary storage information list 307 includes the storage inhibition item (YES in step S805), the processing advances to step S807. As an example, it is assumed that when the setting in FIG. 5C includes the list ID 308 of ID "0001", and the selection instruction to store the temporary storage information list 307 to the parameter setting history list 304 in the normal mode 301 is received from the user. In that case, in step S805, the CPU 101 determines whether the temporary storage information list 307 corresponding to the list ID 308 of ID 0001 includes the item of the device setting category 203. The temporary storage information list 307 includes the adjustment of the fixing temperature. Thus, the processing advances to step S807.

In step S807, the CPU 101 deletes all the temporary storage information lists 307 in the adjustment value temporary storage list 306 and all the list IDs 308. More specifically, the CPU 101 deletes the temporary storage information list 307 corresponding to the list ID 308, instead of storing the temporary storage information list 307.

In step S808, the CPU 101 deletes the temporary 305 in FIG. 3B from the HDD 104. In step S809, the CPU 101 shifts the state of the image forming apparatus from the adjustment mode 302 to the normal mode 301. Then, the processing ends.

According to the present exemplary embodiment, if the CPU 101 determines that the items stored in the temporary storage information list 307 include the storage inhibition item, the parameter of the item set in the adjustment mode is deleted. Therefore, it is possible to prevent unpreferable history information from being stored in the HDD 104. Further, if the CPU 101 determines that the item stored in the temporary storage information list 307 does not include the storage inhibition item, the parameter of the item set in the adjustment mode 302 can be stored as new history information to the HDD 104.

According to the present exemplary embodiment, it is possible to temporarily store not only partial setting contents related to the image processing but also setting contents related to the apparatus operation and to then restore the setting contents as a temporary setting at an arbitrary timing. Further, when the adjustment mode is ended, and if the setting includes the adjustment value or the parameter whose change is prohibited except for an adjustment purpose, the restoration is not allowed. Whereas if the setting does not include the adjustment value or the parameter whose change is prohibited, the setting is stored as the history information for restoration.

Accordingly, many settings of the image forming apparatus can be efficiently managed as the history information, so that the image processing condition can be adjusted according to the desirable preferable setting. By prohibiting the item which may cause a critical influence on an image and can be changed only by the user as the administrator with special knowledge from being restored, the influence on the device due to an erroneous operation can be prevented.

The first exemplary embodiment is described with use of printing of characters with respect to the additional information created from the ID corresponding to the adjustment value temporary storage list 306 and the parameter stored therein. However, any method may be applied as long as it can draw the additional information. A two-dimensional code or an electronic watermark may be used as the additional information and may be combined to the image information. Further, the additional information may be restored by reading and analyzing the image to specify the ID when the parameter may be restored.

The sequences in the flowcharts are examples. The execution order of the steps on the sequences may be exchanged and another processing may be combined.

The UI screen displayed on the operation unit 116 may be controlled to be displayed by communication with an external display device, e.g., a mobile data processing device including a display device by wiring or wireless manner.

The UI screen may be obtained from a server device on the network and displayed. Alternatively, the history information stored in the HDD 104 may be managed under a cloud computing environment to reduce a memory load on the image forming apparatus side.

If the image forming apparatus receives an instruction to change the parameter of the adjustment item included in the device setting category 203 via the operation unit 116, an input of an administrator code (password) may be requested via the operation unit 116. If authentication is successful with the administrator code, the CPU 101 may permit the user to change the parameter of the adjustment item included in the device setting category 203.

On the other hand, if the authentication is not successful with the administrator code, the CPU 101 may prohibit the user from changing the parameter of the adjustment item included in the device setting category 203 and display an error message. Thus, the parameter of the adjustment item included in the device setting category 203 can be changed only by a user who knows the administrator code. Further, such adjustment item is not stored as the history information, and it is possible to prevent a user who does not know the administrator code from setting the parameter of the adjustment item included in the device setting category 203 based on the history information.

Further, according to the first exemplary embodiment, the CPU 101 controls whether the adjustment item is stored as the history. More specifically, in step S805, the CPU 101 determines whether the adjustment item in the temporary storage information list 307 of the adjustment value temporary storage list 306 includes the storage inhibition item. If the adjustment item does not include the storage inhibition item, the CPU 101 adds the temporary storage information list 307 to the parameter setting history list 304 in the normal mode 301. On the other hand, if the adjustment item includes the storage inhibition item, the CPU 101 does not add the temporary storage information list 307 to the parameter setting history list 304 in the normal mode 301. Such control is described as an example.

However, the present invention is not limited to the above-described control. The CPU 101 may store all the created temporary storage information lists 307 as the history to the parameter setting history list 304 in the normal mode 301, and may perform control as following. If the adjustment item in the stored temporary storage information list 307 includes the storage inhibition item, the CPU 101 may prohibit reading of the adjustment item for setting.

On the other hand, if the adjustment item in the stored temporary storage information list 307 does not include the storage inhibition item, the CPU 101 may perform control to read the stored temporary storage information list 307 from the history and to set the parameter of the adjustment item without prohibiting the reading of the adjustment item for the setting. The above method also can prevent the influence on the device due to an erroneous operation by prohibiting the item which may cause a critical influence on an image and can be changed only by the user as the administrator with special knowledge from being restored.

Aspects of the present invention can also be realized by a computer of a system or apparatus (or devices such as a CPU, a micro processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-095349 filed Apr. 21, 2011, which is hereby incorporated by reference herein in its entirety.

What is claimed is:

1. An image forming apparatus comprising:
a setting unit configured to set a parameter for an adjustment item related to image formation;
a determining unit configured to determine whether the adjustment item corresponding to the parameter set by the setting unit includes a storage inhibition item;
a storing control unit configured to perform control to store the parameter set by the setting unit as history information in a storing unit in a case where the determining unit determines that the adjustment item does not include the storage inhibition item, and not to store the parameter set by the setting unit as the history information to the storing unit in a case where the determining unit determines that the adjustment item includes the storage inhibition item; and
a control unit configured to read the parameter stored in the storing unit and to set the parameter to the adjustment item related to the image formation.

2. The image forming apparatus according to claim 1, wherein the storing control unit causes the storing unit to store a plurality of history information pieces therein, and wherein the control unit sets the history information selected by a user from the plurality of the history information pieces to the adjustment item related to the image formation.

3. The image forming apparatus according to claim 1, further comprising:
an image formation unit configured to perform image formation according to the parameter set by the setting unit or the parameter read by the control unit.

4. The image forming apparatus according to claim 1, wherein the storage inhibition item includes an item related to an image writing position, an item related to a temperature of a fixing device, or an item related to printing of a background pattern.

5. An image forming apparatus comprising:
a setting unit configured to set a parameter with respect to an item related to image formation;
a storing control unit configured to perform control to store the parameter set by the setting unit as history information to a storing unit;
a determining unit configured to determine whether the parameter stored in the storing unit includes a parameter corresponding to a storage inhibition item; and
a control unit configured to perform control to set the parameter stored in the storing unit by the setting unit in a case where the determining unit determines that the parameter stored in the storing unit does not include the parameter corresponding to the storage inhibition item, and to perform control not to set the parameter stored in the storing unit by the setting unit in a case where the determining unit determines that the parameter stored in the storing unit includes the parameter corresponding to the storage inhibition item.

6. A method for controlling an image forming apparatus, the method comprising:
setting a parameter for an adjustment item related to image formation;
determining whether the adjustment item corresponding to the set parameter includes a storage inhibition item;
performing control to store the set parameter as history information in a storing unit in a case where it is determined that the adjustment item does not include the storage inhibition item, and not to store the set parameter unit as the history information to the storing unit in a case where it is determined that the adjustment item includes the storage inhibition item; and
setting the parameter stored in the storing unit to the adjustment item related to the image formation.

* * * * *